United States Patent
Jenne et al.

(10) Patent No.: US 10,474,583 B2
(45) Date of Patent: Nov. 12, 2019

(54) SYSTEM AND METHOD FOR CONTROLLING CACHE FLUSH SIZE

(71) Applicant: Dell Products L.P., Round Rock, TX (US)

(72) Inventors: John E. Jenne, Austin, TX (US); Stuart Allen Berke, Austin, TX (US); Vadhiraj Sankaranarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 639 days.

(21) Appl. No.: 15/222,769

(22) Filed: Jul. 28, 2016

(65) Prior Publication Data
US 2018/0032439 A1 Feb. 1, 2018

(51) Int. Cl.
*G06F 12/00* (2006.01)
*G06F 12/0891* (2016.01)
*G06F 12/0897* (2016.01)
*G06F 12/0893* (2016.01)
*G06F 12/0804* (2016.01)

(52) U.S. Cl.
CPC ...... *G06F 12/0891* (2013.01); *G06F 12/0804* (2013.01); *G06F 12/0893* (2013.01); *G06F 12/0897* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 2003/0084248 A1* | 5/2003 | Gaither | G06F 12/0804 711/133 |
| 2014/0052925 A1 | 2/2014 | Kotzur et al. | |
| 2014/0095794 A1* | 4/2014 | Moses | G06F 12/0891 711/128 |
| 2016/0147657 A1 | 5/2016 | Jiang et al. | |

OTHER PUBLICATIONS

U.S. Appl. No. 14/699,968, filed Apr. 29, 2015, 35 pages.
U.S. Appl. No. 15/063,903, filed Mar. 8, 2016, 17 pages.
U.S. Appl. No. 14/829,314, filed Aug. 18, 2015, 31 pages.
U.S. Appl. No. 14/832,890, filed Aug. 21, 2015, 32 pages.

* cited by examiner

*Primary Examiner* — Midys Rojas
(74) *Attorney, Agent, or Firm* — Baker Botts L.L.P.

(57) ABSTRACT

An information handling system may implement a method for controlling cache flush size by limiting the amount of modified cached data in a data cache at any given time. The method may include keeping a count of the number of modified cache lines (or modified cache lines targeted to persistent memory) in the cache, determining that a threshold value for modified cache lines is exceeded and, in response, flushing some or all modified cache lines to persistent memory. The threshold value may represent a maximum number or percentage of modified cache lines. The cache controller may include a field for each cache line indicating whether it targets persistent memory. Limiting the amount of modified cached data at any given time may reduce the number of cache lines to be flushed in response to a power loss event to a number that can be flushed using the available hold-up energy.

20 Claims, 7 Drawing Sheets

| Index \ Ways | 0 | 1 | 2 | 3 |
|---|---|---|---|---|
| 0 | Invalid | Shared | Shared | Modified |
| 1 | Shared | Modified | Modified | Exclusive |
| 2 | Exclusive | Invalid | Shared | Modified |
| 3 | Modified | Shared | Modified | Invalid |
| 4 | Invalid | Shared | Shared | Modified |
| 5 | Shared | Modified | Modified | Exclusive |
| 6 | Exclusive | Invalid | Shared | Modified |
| 7 | Modified | Shared | Modified | Invalid |

FIG. 4B

| Index \ Ways | 0 | 1 | 2 | 3 |
|---|---|---|---|---|
| 0 | Invalid | Shared | Shared | Modified |
| 1 | Shared | Modified | Modified | Exclusive |
| 2 | Exclusive | Invalid | Shared | Modified |
| 3 | Modified | Shared | Modified | Invalid |
| 4 | Invalid | Shared | Shared | Modified |
| 5 | Shared | Modified | Modified | Exclusive |
| 6 | Exclusive | Invalid | Shared | Modified |
| 7 | Modified | Shared | Modified | Modified |

FIG. 4C

| Index \ Ways | 0 | 1 | 2 | 3 |
|---|---|---|---|---|
| 0 | Invalid | Shared | Shared | Exclusive |
| 1 | Shared | Exclusive | Exclusive | Exclusive |
| 2 | Exclusive | Invalid | Shared | Exclusive |
| 3 | Exclusive | Shared | Exclusive | Invalid |
| 4 | Invalid | Shared | Shared | Exclusive |
| 5 | Shared | Exclusive | Exclusive | Exclusive |
| 6 | Exclusive | Invalid | Shared | Exclusive |
| 7 | Exclusive | Shared | Exclusive | Exclusive |

500

| 502 | 504 | 506 | 508 | 510 | 512 | 514 |
|---|---|---|---|---|---|---|
| CACHING DISABLED | REFERENCED | MODIFIED | PERSISTENT MEMORY | PROTECTION BIT(S) | PRESENT / ABSENT | PHYSICAL PAGE FRAME NUMBER |

SYSTEM AND METHOD FOR CONTROLLING CACHE FLUSH SIZE

BACKGROUND

Field of the Disclosure

This disclosure relates generally to information handling systems and, more particularly, to controlling the number of cache lines to be flushed to persistent memory due to an impending power loss event or other system event.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some information handling systems, and for many applications, CPU caches configured for write-back provide performance advantages over write-through caches. For example, in systems that access persistent memory via the SRAM memory interface of the CPU, a write-back cache is desirable for performance reasons. However, the industry is moving to support write-through caches due, in part, to challenges in holding-up the system long enough after a power fault to enable the flushing of write-back caches to persistent memory (in order to avoid data loss). In some cases, software is required to periodically issue cache-line-level flushes to minimize the amount of data that could be exposed. This approach creates software overhead that impacts performance and requires sophisticated software mechanisms to recover from the loss of modified data in the cache.

SUMMARY

In one aspect, a disclosed method is for controlling cache flush size during a power loss event or other system event. The method may include setting a threshold value for modified cache lines in a cache, writing to a cache line in the cache, determining whether or not the writing causes the cache line to transition to a modified state and, in response to determining that the writing causes the cache line to transition to the modified state, incrementing a count of modified cache lines in the cache, determining, dependent on the incremented count, whether or not the threshold value for modified cache lines in the cache is exceeded, and flushing one or more modified cache lines in the cache to persistent memory, in response to determining that the threshold value for modified cache lines in the cache is exceeded.

In any of the disclosed embodiments, flushing one or more modified cache lines in the cache to the persistent memory may include flushing all modified cache lines in the cache to the persistent memory.

In any of the disclosed embodiments, flushing one or more modified cache lines in the cache to the persistent memory may include flushing a number of modified cache lines in the cache to the persistent memory that is sufficient to reduce the modified cache lines in the cache below the threshold value for modified cache lines in the cache. The one or more modified cache selected for flushing may be dependent on an applicable cache replacement policy.

In any of the disclosed embodiments, the threshold value may represent a maximum allowed number of cache lines in the cache that are in the modified state.

In any of the disclosed embodiments, the threshold value may represent a maximum allowed percentage of cache lines in the cache that are in the modified state, and determining whether or not the threshold value for modified cache lines in the cache is exceeded may include calculating, dependent on the incremented count, the percentage of cache lines in the cache that are in the modified state.

In any of the disclosed embodiments, the threshold value may represent a maximum allowed number of cache lines in the cache that are in the modified state and that are targeted to the persistent memory, and the count of modified cache lines in the cache may include a count of cache lines in the cache that are in the modified state and that are targeted to the persistent memory. Flushing the one or more modified cache lines in the cache to the persistent memory may include flushing to the persistent memory one or more modified cache lines in the cache that are targeted to persistent memory.

In any of the disclosed embodiments, flushing the one or more modified cache lines in the cache to the persistent memory may include transitioning the one or more modified cache lines from the modified state to an exclusive state.

In any of the disclosed embodiments, flushing the one or more modified cache lines in the cache to the persistent memory may include transitioning the one or more modified cache lines from the modified state to an invalid state.

In any of the disclosed embodiments, the threshold value may be dependent on one or more of available hold-up energy in the system or an amount of time to flush the one or more modified cache lines to the persistent memory.

In any of the disclosed embodiments, setting the threshold value for modified cache lines in the cache may include setting the threshold value to a fixed value during an initialization of the information handling system.

In any of the disclosed embodiments, setting the threshold value for modified cache lines in the cache may include setting the threshold value to an initial threshold value. The method may further include modifying the threshold value for modified cache lines in the cache during operation of the information handling system in response to an increase or decrease in hold-up energy.

Another disclosed aspect includes an information handling system including at least one cache and a cache controller. The cache controller may include circuitry to store a threshold value for modified cache lines in a cache, detect a write to a cache line in the cache, determine whether or not the write causes the cache line to transition to a modified state and, in response to a determination that that the write causes the cache line to transition to the modified state, to increment a count of modified cache lines in the cache, determine, dependent on the incremented count, whether or not the threshold value is exceeded, flush one or more modified cache lines in the cache to persistent memory, in response to a determination that the threshold value is exceeded, and elide a flush of the one or more modified cache lines in the cache to persistent memory, in response to a determination that the threshold value is not exceeded.

In any of the disclosed embodiments, to flush the one or more modified cache lines in the cache to the persistent memory, the cache controller includes circuitry to flush all modified cache lines in the cache to the persistent memory, or to flush, dependent on an applicable cache replacement policy, a number of modified cache lines in the cache to the persistent memory that is sufficient to reduce the modified cache lines in the cache below the threshold value for modified cache lines in the cache.

In any of the disclosed embodiments, the threshold value may be dependent on one or more of available hold-up energy in the system or an amount of time to flush the one or more modified cache lines to the persistent memory.

In any of the disclosed embodiments, the threshold value may represent a maximum allowed number of cache lines in the cache that are in the modified state or a maximum allowed percentage of cache lines in the cache that are in the modified state.

In any of the disclosed embodiments, the threshold value for modified cache lines in the cache may be configurable during an initialization of the information handling system or during operation of the information handling system.

In any of the disclosed embodiments, the information handling system may further include a page table including a plurality of entries, each of which includes a first field whose value indicates whether or not a respective cache line is targeted to persistent memory and a second field whose value indicates whether or not the respective cache line has been modified. The threshold value may represent a maximum allowed number of cache lines in the cache that are in the modified state and that are targeted to the persistent memory. The cache controller may further include circuitry to determine, dependent on its respective page table entry, whether or not the written cache line is targeted to persistent memory, and to increment the count of modified cache lines in the cache in response to a determination that the written cache line is targeted to persistent memory. To flush the one or more modified cache lines in the cache to persistent memory, the cache controller may further includes circuitry to flush to the persistent memory only cache lines in the cache that are in the modified state and that are targeted to the persistent memory.

A further disclosed aspect includes a cache controller. The cache controller may include circuitry to store a threshold value for modified cache lines in a cache, detect a write to a cache line in the cache, determine whether or not the write causes the cache line to transition to a modified state and, in response to a determination that that the write causes the cache line to transition to the modified state, to increment a count of modified cache lines in the cache, determine, dependent on the incremented count, whether or not the threshold value is exceeded, flush one or more modified cache lines in the cache to persistent memory, in response to a determination that the threshold value is exceeded, and elide a flush of the one or more modified cache lines in the cache to persistent memory, in response to a determination that the threshold value is not exceeded.

In any of the disclosed embodiments, to flush the one or more modified cache lines in the cache to the persistent memory, the cache controller may include circuitry to flush all modified cache lines in the cache to the persistent memory, or to flush, dependent on an applicable cache replacement policy, a number of modified cache lines in the cache to the persistent memory that is sufficient to reduce the modified cache lines in the cache below the threshold value for modified cache lines in the cache.

In any of the disclosed embodiments, the threshold value may be dependent on one or more of available hold-up energy in the system or an amount of time to flush the one or more modified cache lines to the persistent memory.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As will be described in further detail, the inventors of the present disclosure have developed methods and systems disclosed herein for controlling cache flush size in an information handling system. In various embodiments, these systems and methods may limit the amount of modified (dirty) cached data to be flushed to persistent memory upon a system power failure or other power loss event. For example, these systems and methods may be used to flush the contents of some or all of the modified cache lines in the cache to persistent memory when the amount of modified (dirty) cached data in the cache reaches a configurable threshold amount. In some embodiments, these techniques may also reduce the amount of modified (dirty) cached data to be flushed to persistent memory due to other types of system events (e.g., resets, system hang-ups, system faults, or internal processor errors, among others).

In some embodiments, the method may include setting a threshold value for modified cache lines in a cache, determining, upon writing to a cache line in the cache, that the writing causes the cache line to transition to a modified state, incrementing a count of modified cache lines in the count, determining that the threshold value for modified cache lines is exceeded, and flushing the contents of one or more modified cache lines to persistent memory, in response to determining that the threshold value is exceeded. A cache controller in the information handling system may include circuitry to store the threshold value of modified cache lines in the cache, detect a write to the cache, determine whether or not the write causes the cache line to transition to a modified state, increment a count of modified cache lines in response to determining that the write causes the cache line to transition to a modified state, determine, dependent on the incremented count, whether or not the threshold value is exceeded, flush the contents of one or more modified cache lines, in response to determining that the threshold value is exceeded, and refrain from flushing any modified cache lines, in response to determining that the threshold value is not exceeded.

Particular embodiments are best understood by reference to FIGS. 1, 2, 3A-3B, 4A-4C, 5, and 6, in which like numbers are used to indicate like and corresponding parts.

Figure 1:
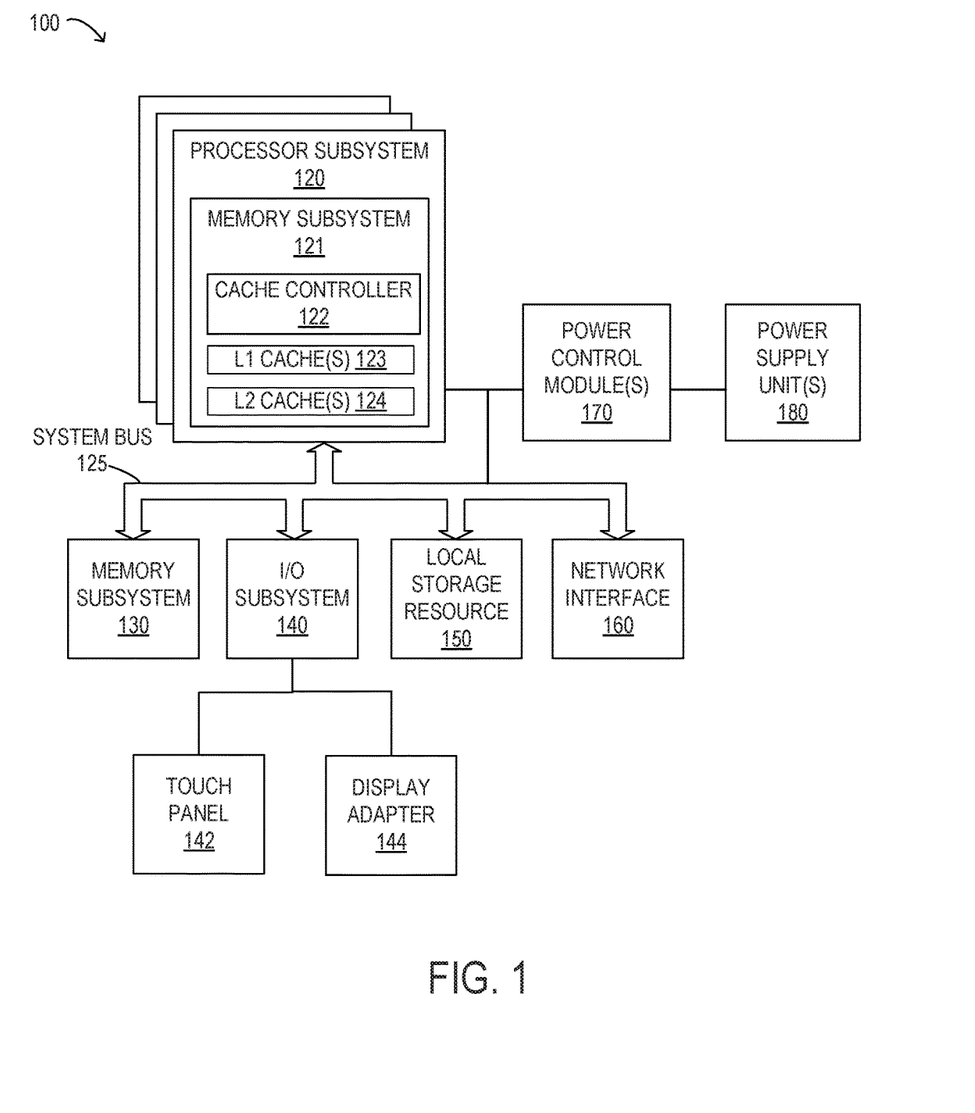
FIG. 1 is a block diagram of selected elements of an embodiment of an information handling system.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

As illustrated in FIG. 1, a memory subsystem 121 within processor subsystem 120 may include multiple data caches, such as one or more level 1 (L1) caches 123 and/or level 2 (L2) caches 124. For example, a level 1 cache 123 may be local to a particular processor or processor core within processor subsystem 120, and a level 2 cache 124 may be shared between multiple processors or processor cores within a processor subsystem 120. In some embodiments of the present disclosure, one or more of these caches may be implemented as write-back caches. In such embodiments, the modified contents of the write-back caches may be written out to persistent memory (e.g., a non-volatile memory within memory subsystem 130 or local storage resource 150) in response to a power loss event. A cache controller 122 within memory subsystem 121 may include circuitry to manage the contents of one or more L1 caches 123 and/or L2 caches 124. For example, cache controller 122 may include circuitry to determine when and if an individual cache line or a group of cache lines should be evicted from one of the caches in accordance with a predetermined cache line replacement policy. In at least some embodiments, cache controller 122 may also include circuitry to limit the amount of modified (dirty) cached data that would be flushed to persistent memory upon a system power failure or other power loss event, such as by flushing the contents of at least some of the modified cache lines in one of the caches to persistent memory when and if the amount of modified (dirty) cached data in the cache reaches a configurable threshold amount.

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. In some embodiments, memory subsystem 130 may include a level 3 (L3) cache or a last-level cache, which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

As illustrated in FIG. 1, system 100 may include one or more power control modules 170 and one or more power supply units (PSUs) 180. In at least some embodiments, power control modules 170 may include power distribution circuitry. In at least some embodiments, power control module(s) 170 may control the allocation of power generated by one or more of the power supply units (PSUs) 180 to other resources in system 100. In some embodiments, one or more of the power control modules 170 may include a management controller (MC).

As referred to herein, system "hold-up" may be defined in terms of energy (e.g., power×time). For example, the "hold-up energy" in an information handling system (such as system 100 illustrated in FIG. 1) may represent the amount of energy available following a power fault or other power-loss event in the system. In a system that includes one or more write-back caches, the time to flush the write-back caches to the persistent memory and the power consumption of the system during the cache flushing affect the amount of hold-up energy that may need to be available in order to avoid data loss following a power fault or other power-loss event. For example, in some existing systems, the time to complete the cache flushing may be on the order of 3 ms-50 ms, depending on the memory configuration in the system, the performance of the persistent memory target, and/or other factors. In some modern systems, the caches may be very large and there may be several layers of caches (L1, L2, L3) in the processor. In such systems, there may not be enough time (nor enough hold-up energy) to flush all of the contents of the caches following a power fault or other power-loss event, such as when the A/C power goes off In at least some embodiments of the systems described herein, rather than reducing the amount of energy needed to flush individual cache lines (or groups of cache lines) to persistent memory in order to avoid data loss due to a power fault or other power loss event, the amount of modified (dirty) cached data that would need to be flushed to persistent memory upon a system power failure may be limited. In some embodiments, the amount of modified data (e.g., the number or percentage of cache lines containing modified data) allowed in a given cache (or caches) at any one time may be set according to the available hold-up energy in the system and time needed to flush the modified cache lines in the cache(s) to persistent memory. The maximum amount of modified data that is allowed to be cached at any given time may be static, and may be set at initialization or boot time (e.g., at power-up), in some embodiments. In other embodiments, the maximum amount of modified data that is allowed to be cached at any given time may be adjusted as hold-up energy increases (e.g., if additional battery capacity is added) or decreases (e.g., as battery life degrades) while the system is operational. In such embodiments, the effective modifiable cache size may thus be considered to be programmable. Note that the time and energy needed to flush the cache(s) may be dependent only on the amount of modified cached data and not on the overall cache size. Unlike in some existing systems that simply reduce the overall cache size in order to reduce the amount of hold-up energy that would be required to flush the cache(s), under the approach described herein, the modified cache size is reduced, but the original cache size is preserved for cache lines in other states, therefore minimizing the impact of this approach on overall performance.

In at least some embodiments, the cache controllers of the systems described herein may include hardware circuitry or logic to implement a mechanism for flushing the modified contents of a write-back cache to persistent memory on a timely basis in order to limit the amount of modified cached data that would need to be flushed to persistent memory using the available hold-energy following a power fault or other power loss event. In some embodiments, at runtime, the cache controller may determine which, if any, of the cache lines include contents that are specific to the persistent memory and may flush these cache lines regularly, so that persistence is achieved. In some embodiments, the cache controllers described herein may include mechanisms to support an enhanced Asynchronous DRAM Refresh (eADR) feature in the information handling system, which includes flushing at least some write-protected data buffers and/or modified cache lines to persistent memory.

Figure 2:
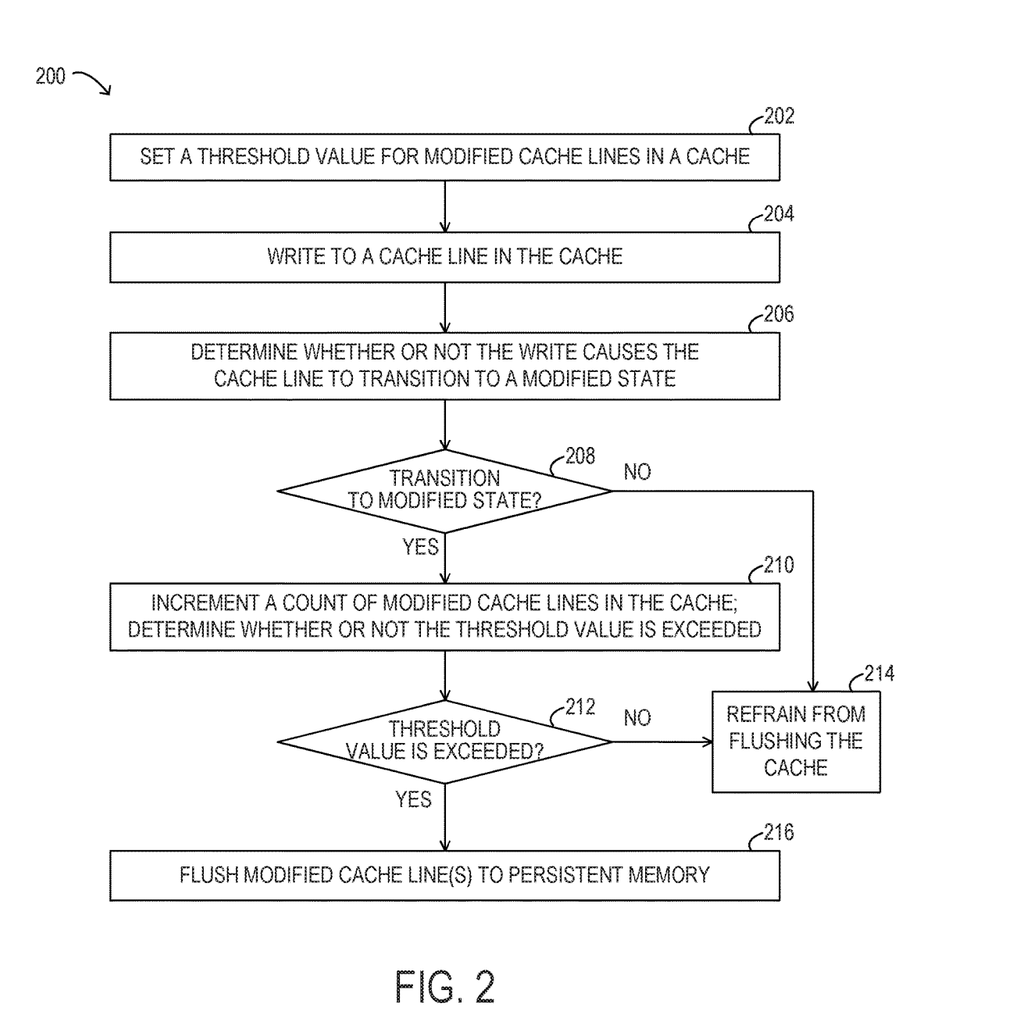
FIG. 2 is flowchart depicting selected elements of an embodiment of a method for controlling cache flush size.

Referring now to FIG. 2, a block diagram of selected elements of an embodiment of a method 200 for controlling cache flush size, as described herein, is depicted in flowchart form. In various embodiments, method 200 may be performed by one or more instances of an information handling system 100 (see FIG. 1). It is noted that certain operations described in method 200 may be optional or may be rearranged in different embodiments.

In FIG. 2, method 200 may begin (at 202) with the setting of a threshold value for modified cache lines in a data cache. In some embodiments, the threshold value may represent a maximum number of cache lines in the cache that are in a modified state. In other embodiments, the threshold value may represent a maximum percentage of cache lines in the cache that are in a modified state. In method 200 (at 204) there may be a write to a cache line in the cache. In method 200 (at 206) a determination may be made as to whether or not the write to the cache line causes the cache line to transition to a modified state (from another state).

In method 200, if (at 208) it is determined that the write to the cache line does not cause the cache line to transition to a modified state, method 200 may include (at 214) refraining from flushing the cache. However, if (at 208) it is determined that the write to the cache line does cause the cache line to transition to a modified state, method 200 may include (at 212) determining whether or not the threshold value for modified cache lines is exceeded. In method 200, if (at 212) it is determined that the threshold value is not exceeded, method 200 may include (at 214) refraining from flushing the cache. However, if (at 212) it is determined that the threshold value is exceeded, method 200 may include (at 216) flushing one or more cache lines in the cache that are in the modified state to persistent memory.

In at least some embodiments of the present disclosure, the cache controller may include hardware circuitry or logic to maintain a running count of the number of modified cache lines in a given cache (or collection of caches). When, and if, the modified cache line count exceeds a threshold that has been configured in the system, the cache controller may automatically flush one or more modified cache line(s) to persistent memory. This approach may be used to manage (e.g., to limit) the amount of modified cached data that is resident in the cache(s) at any given time. In at least some embodiments, since the time to complete the eADR process may be dependent only on the amount of modified cached data and not on the overall cache size, the approach described herein may reduce eADR time by limiting the amount of modified cached data that would otherwise need to be flushed to persistent memory in response to a power fault or other power loss event.

In at least some embodiments of the present disclosure, the approach described herein for limiting the amount of modified cached data may be dependent on cache line states defined by a cache coherence protocol implemented in the system. For example, this approach may be dependent on the implementation of a cache coherence protocol in the system that includes at least one state indicating that a given cache line (or collection of cache lines) has been modified and at least one other state indicating that the given cache line (or collection of cache lines) has not been modified. Several example embodiments are described herein in terms of the states defined by the MESI or MOESI cache coherence protocols. Both of these cache coherence protocols define a "modified" state, an "exclusive" state, a "shared" state, and an "invalid" state, and the MOESI cache coherence protocol also includes an "owned" state. However, the states defined by other cache coherence protocols may be mapped to the approach described herein, in different embodiments.

In general, when cache lines are fetched from the main memory, they come to the memory in a state defined by the cache coherence protocol and by what the processor wants to do with them (e.g., read or modify them). In one embodiment, a cache line may, when fetched from memory, initially be placed in an "exclusive" state or a "shared" state, depending on whether the contents are intended to be modified or simply read. Until and unless the contents of the cache line are modified, the cache line may not be transitioned to a "modified" state. However, when and if the cache line contents are modified, the cache line may be transitioned to the modified state. If and when the cache line is evicted due to an applicable cache replacement policy, only the cache lines that are dirty (e.g., that are in the modified state) are evicted (flushed) to the main memory. This is because there should already be an exact copy of any unmodified cache lines (e.g., those in any other state) in the main memory. For example, the main memory may include all data that is persistent in the processor until and unless the processor modifies it (in which case a cache stores the modified data) and the processor has not yet committed the modified contents of the cache to the main memory.

In at least some embodiments, the eADR time may be controlled by the system configuring the cache controller to limit the amount of cache lines in the cache that are in the modified state. For example, the cache controller may maintain a running counter that is incremented any time a cache line transitions to the modified state. Writes to a cache line that is already in the modified state may have no bearing on the total amount of modified cached data. Once a predetermined threshold value is reached (e.g., once a predetermined number of modified cache lines is reached or a predetermined percentage of the cache lines are in the modified state), the cache controller may flush some or all of the cache lines that are in the modified state to persistent memory in order to enforce the limit on modified cached data programmed by the system In various embodiments, when flushing some or all of the modified cache lines to persistent memory, the cache controller may take different actions or collections of actions. Examples of these actions may include, but are not limited to, the following:
 Flush all of the modified cache lines to persistent memory, but do not invalidate them, as follows:
  Each of the flushed cache lines is transitioned from the modified state to an exclusive state
  Subsequent reads/writes to these cache lines would benefit from a cache hit.
 Flush all of the modified cache lines to persistent memory and invalidate them, as follows:
  Each of the flushed cache lines is transitioned from the modified state to an invalid state
  Subsequent reads/writes to these cache lines would incur a cache miss.

Flush some individual modified cache lines (or groups of modified cache lines), but not all modified cache lines, to persistent memory, but do not invalidate them, as follows:

Each of the flushed cache lines is transitioned from the modified state to an exclusive state Subsequent reads/writes to these cache lines would benefit from a cache hit.

The amount of modified cache data may be reduced by enough to enforce the predetermined limit but may not be reduced to zero. Various algorithms may be applied to determine which cache line(s) to replace, including algorithms that employ a LIFO or FIFO approach, or that evict the least recently accessed cache lines.

Figure 3A:
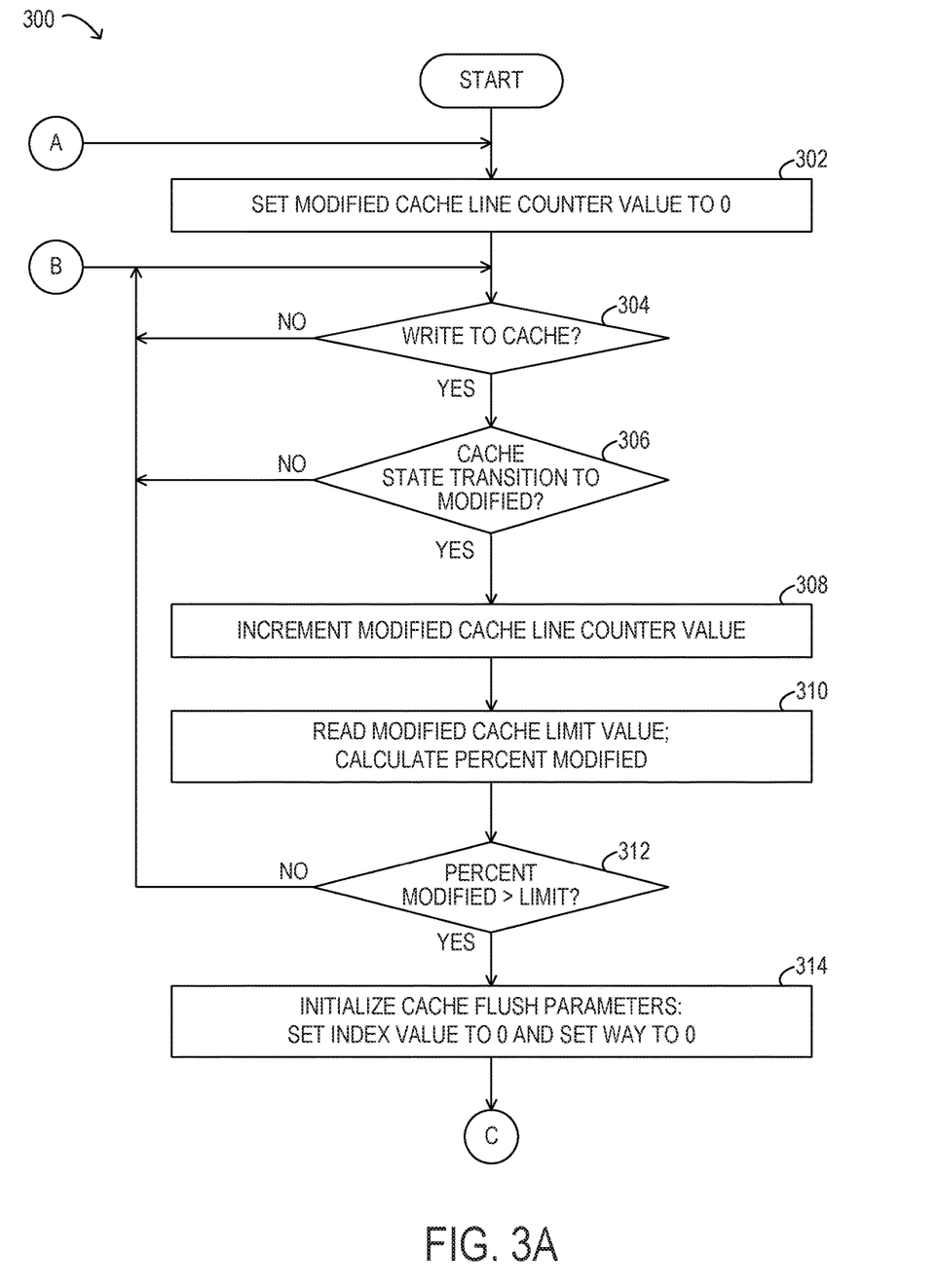
FIG. 3A and FIG. 3B depict selected elements of an embodiment of a method for determining whether to flush a cache based on a count of modified cache lines.
Figure 3B:
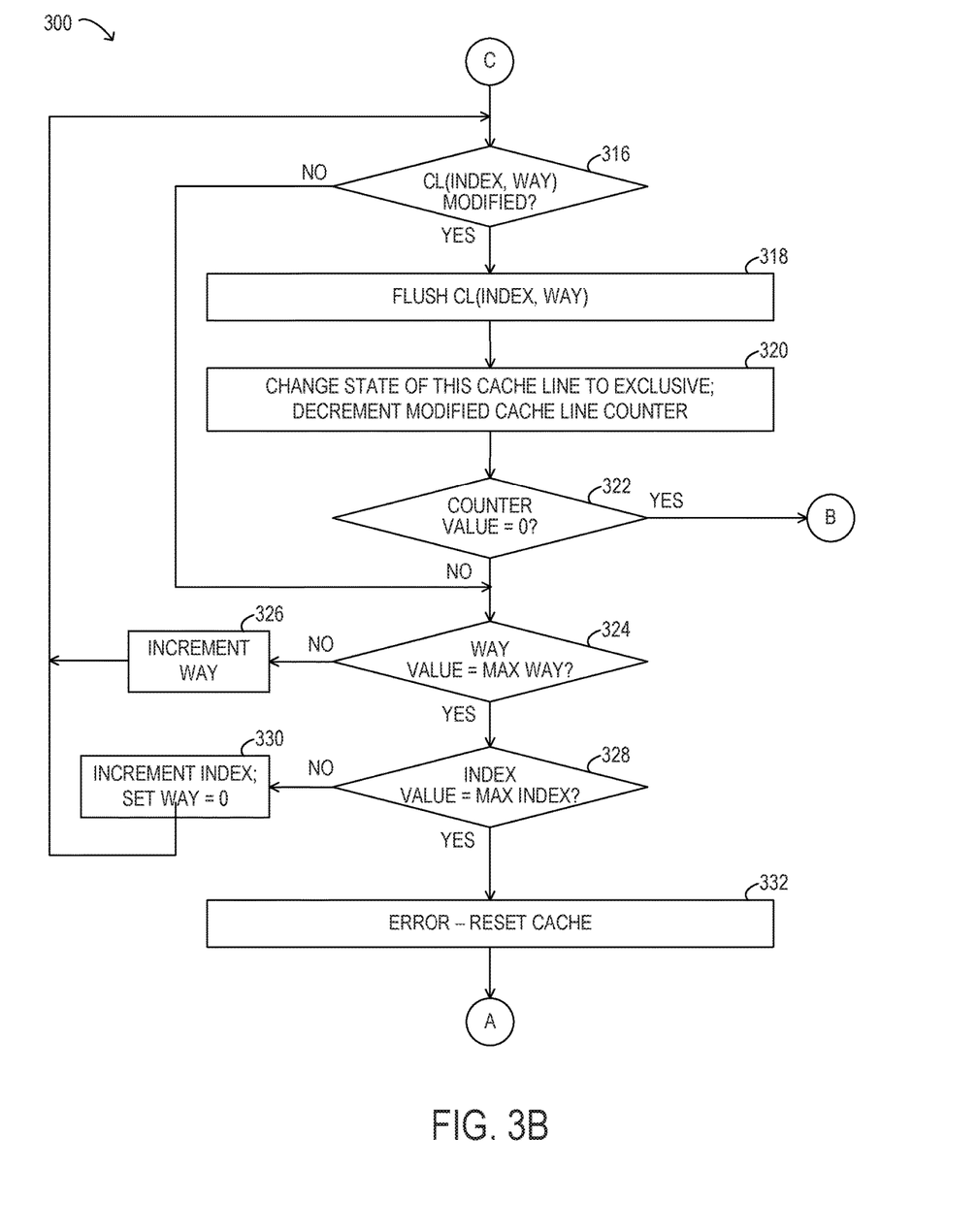

Referring now to FIGS. 3A and 3B, a block diagram of selected elements of an embodiment of a method 300 for determining whether to flush a cache based on a count of modified cache lines, as described herein, is depicted in flowchart form. In various embodiments, method 300 may be performed by one or more instances of an information handling system 100 (see FIG. 1). It is noted that certain operations described in method 300 may be optional or may be rearranged in different embodiments. In at least some embodiments, some or all of the operations illustrated in FIGS. 3A and 3B may be performed by a cache controller in an information handling system to enforce a predetermined limit on the number of modified cached lines in a cache. In some embodiments, one or more operations of method 300 may be performed by a state machine implemented in the cache controller or elsewhere in the information handling system.

In FIG. 3A, method 300 may begin (at 302) with the setting of a modified cache line counter value for a data cache to 0. In method 300, if (at 304) there is a write to the cache and if (at 306) the write causes a cache state transition to a modified state, the method continues at 308. In method 300, while (at 304) there is no write to cache and/or while (at 306) there is no cache state transition to a modified state, a trigger condition for deciding to flush the cache based on a count of modified cache lines remains unmet, and the method continues (at 304) by waiting for a write to the cache.

In method 300 (at 308) the modified cache line counter value is incremented. In method 300 (at 310) a modified cache limit value is read and the percentage of cache lines that are in the modified state is calculated. In method 300, if (at 312) it is determined that the percentage of cache lines that are in the modified state is less than or equal to the modified cache limit value, a trigger condition for deciding to flush the cache based on a count of modified cache lines remains unmet, and the method continues (at 304) by waiting for a write to the cache.

In method 300, if (at 312) it is determined that the percentage of cache lines that are in the modified state is greater than the modified cache limit value, a trigger condition for deciding to flush the cache based on a count of modified cache lines is met, and the method continues at 314. While FIG. 3A illustrates an embodiment in which a threshold value that, when exceeded, triggers a cache flush represents a maximum percentage of cache lines in the cache that are in the modified state, in another embodiment, the threshold value that, when exceeded, triggers a cache flush may represent a maximum number of cache lines in the cache that are in the modified state. In method 300 (at 314) cache flush parameters are initialized. In this example embodiment, an index value is set to 0 and the way is set to 0, after which method 300 continues at label C shown in FIG. 3B.

In FIG. 3B, method 300 continues at label C. In method 300, if (at 316) it is determined that the state of the cache line identified by the current index and way [cl(index, way)] is not in the modified state, method 300 continues at 324. In method 300, if (at 316) the state of the cache line identified by the current index and way [cl(index, way)] is modified, then (at 318) the cache line identified by cl(index, way) is flushed. In addition (at 320) the cache line state for this cache line is changed to exclusive and the modified cache line counter is decremented. In some embodiments, the cache line may be flushed to persistent memory. In other embodiments, the cache line may be flushed from one cache in a cache hierarchy to a cache at a lower level in the cache hierarchy, from which it may subsequently be flushed to persistent memory.

In method 300, if (at 322) it is determined that the value of the modified cache line counter is zero after it is decremented, method 300 continues at label B in FIG. 3A. In method 300, if (at 322) it is determined that the value of the modified cache line counter is non-zero after it is decremented, method 300 continues at 324. In method 300, if (at 324) it is determined that the way value is not equal to a maximum way value, method 300 continues at 326. In method 300 (at 326) the way value is incremented, after which the method continues at label C.

In method 300, if (at 324) it is determined that the way value is equal to a maximum way value, method 300 continues at 328. In method 300, if (at 328) it is determined that the index value is not equal to a maximum index value for the flush operation, the method continues at 330. In method 300 (at 330) the index value is incremented and the way value is set to zero, after which the method continue at label C. In method 300, if (at 324) it is determined that the way value is equal to the maximum way value and if (at 328) it is determined that the index value is equal to the maximum index value for the flush operation, this may indicate an error condition, and the method may continue at 332. In method 300 (at 332) the cache is reset (e.g., by executing an instruction to perform a write-back operation at all internal and external caches and invalidate the caches, or using some other mechanism), after which the method may continue at label A in FIG. 3A.

Figure 4A:
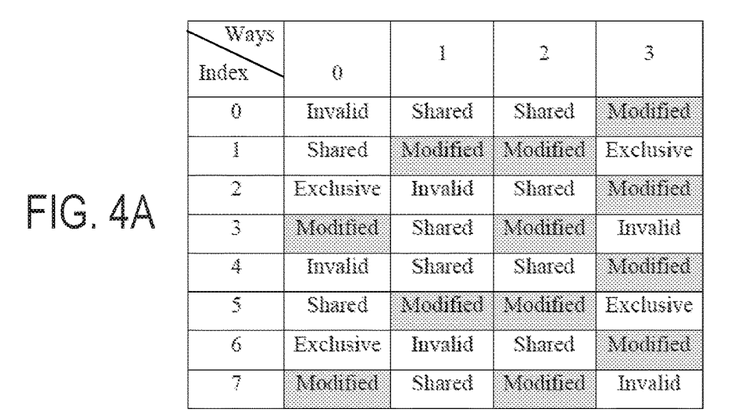
FIGS. 4A-4C depict the respective states of the cache lines in a cache before and after reaching a threshold for modified cache lines that triggers a cache flush, according to at least some embodiments.
Figure 4B:
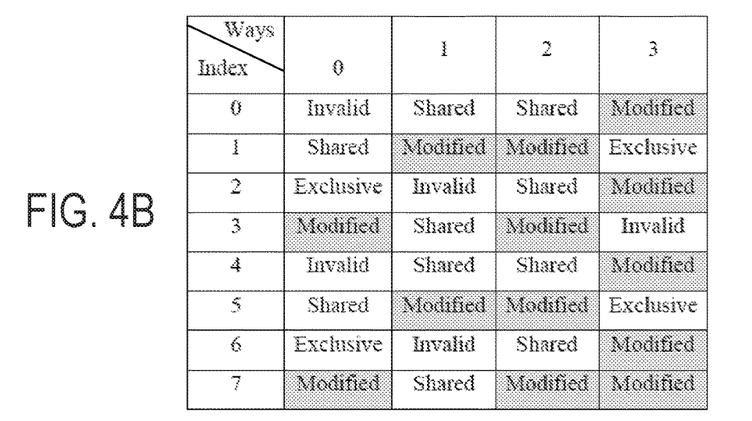
Figure 4C:
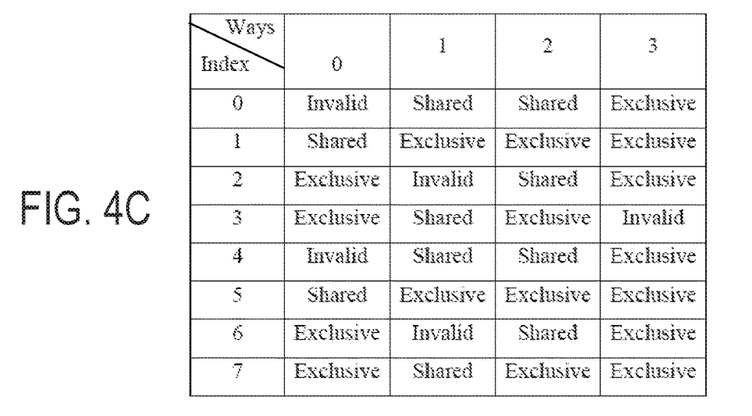

The techniques described herein for limiting the number of cache lines in a data cache that contain modified (dirty) cached data at any given time may be further illustrated by way of the example depicted in FIGS. 4A-4C. In this example, once the current percentage of cache lines in the cache that are in the modified state exceeds a modified cache line threshold value of 40%, the cache controller automatically writes back all of the modified cache lines to persistent memory, after which it resets the current percentage of modified cache lines to 0%. In this example, and in accordance with the MESI protocol, the cache controller flushes, but does not invalidate, the modified cache lines once the modified cache line threshold value is exceeded, thus transitioning these cache lines from the modified state to an exclusive state.

FIGS. 4A-4C depict the respective states of the cache lines in a cache before and after reaching a threshold for modified cache lines that triggers a cache flush, according to at least some embodiments. More specifically, FIG. 4A illustrates the respective states of the cache lines in a cache before reaching the threshold that triggers a cache flush. Here, twelve cache lines, shown as shaded blocks in FIG.

4A, are in the modified state. Since there are 32 cache lines in total, the percentage of cache lines that are in the modified state at this point may be calculated as $^{12}/_{32}$, or 37.5%. Since this percentage does not exceed the threshold value of 40%, the cache controller refrains from initiating a flush of the modified cache lines to persistent memory.

FIG. 4B illustrates the respective states of the cache lines in the cache just after reaching the threshold that triggers a cache flush. Here, thirteen cache lines, shown as shaded blocks in FIG. 4B, are in the modified state. Since there are 32 cache lines in total, the percentage of cache lines that are in the modified state at this point may be calculated as $^{13}/_{32}$, or 40.6%. Since this percentage exceeds the threshold value of 40%, the cache controller may initiate a flush of the modified cache lines to persistent memory.

FIG. 4C illustrates the respective states of the cache lines in the cache after the cache has been flushed. Here, there are no cache lines in the modified state. In this example, the respective state of each of the modified cache lines that were flushed to persistent memory was transitioned to the exclusive state. In other embodiments, the respective state of each modified cache line that is flushed to persistent memory may be transitioned to another state, such as an invalid state.

In some embodiments of the present disclosure, the mechanisms for controlling cache flush size described above may be extended by modifying the cache controller to include a persistent memory (PM) field for each cache line. The value for this field may be provided by the operating system as it performs the mapping of the program's virtual addresses to actual physical addresses in the information handling system. For example, the operating system, which controls the page table, may set the values of respective PM fields in the page table. Subsequently, hardware within the processor may obtain the appropriate PM field value for each cache line from the page table and may set the value of the PM field for each cache line accordingly. In some embodiments, the value of this field may be set to 1 or "true" for a given cache line if the program's virtual address corresponding to the given cache line has been mapped to persistent memory. Otherwise, the value of this field may be set to 0 or "false". In at least some embodiments, the cache controller may include hardware circuitry or logic to maintain a running count of the number of modified cache lines in a given cache (or collection of caches) that are targeted to persistent memory. Unlike the modified cache line counter described earlier, this counter may only count modified cache lines that have been marked as being targeted to persistent memory. When, and if, the current value of this counter exceeds a threshold value for modified cache lines that are targeted to persistent memory that has been configured in the system, the cache controller may automatically flush to persistent memory one or more of the modified cache lines that are targeted persistent memory. In at least some embodiments, this approach may be used to manage (e.g., to limit) the amount of modified cached data on cache lines in the cache(s) that are mapped to persistent memory at any given time. In at least some embodiments, since the time to complete the eADR process may be dependent only on the amount of modified cached data and not on the overall cache size, the approach described herein may reduce eADR time by limiting the amount of modified cached data that would otherwise need to be flushed to persistent memory in response to a power fault or other power loss event.

In some embodiments, in order to keep track of only those modified cache lines that are targeted to persistent memory, the cache controller may make use of operating system (OS) provided hints. In one embodiment, a page table may use the virtual page number of an address as an index into the page table to find the physical page frame number, which contains the contents of the virtual page. Hence, the page table may be considered to implement a function for which the virtual page number is an input and the physical frame number is the output. The specific structure of a page table entry may be machine dependent, but the types of information included in the page tables of different information handling systems may be similar. The size of the page table entries may vary one system to another, in different embodiments. In one embodiment, each of the page table entries may include 32 bits.

In some embodiments, the Translation Look-aside Buffer (TLB) structures in the processor subsystem of the information handling system may be extended to include a PM field (or bit) for every virtual address entry. Hence, whenever a TLB entry is filled due to a page fault for a virtual address lookup, its PM bit may be populated along with the physical address (from the page table). In some embodiments, the cache controller may also include a PM field for every cache line. This bit in the cache controller entry may be filled when the TLB hit for the corresponding virtual address indicates that the physical address belongs to the persistent memory. In other words, the value of the PM bit of the TLB may be copied to the cache controller for every TLB hit. In some embodiments, these changes in the operating system page tables and in the micro-architectural structures inside the processor may make it possible for the cache controller to identify those entries in the cache that are targeted specifically to the persistent memory.

In at least some embodiments, in order to control the eADR time during a power loss, a threshold value representing the maximum number (or percentage) of modified cache lines having a PM field value of 1 may be static, and may be set at initialization or boot time (e.g., at power-up). In other embodiments, a threshold value representing the maximum number (or percentage) of modified cache lines having a PM field value of 1 may be adjusted as hold-up energy increases (e.g., if additional battery capacity is added) or decreases (e.g., as battery life degrades) while the system is operational. The cache controller may, dependent on the value of the PM field for a given cache line and a field indicating whether or not the given cache line has been modified, determined whether or not the threshold value is exceeded. When the threshold value is exceeded, the cache controller may flush targeted to persistent memory only those modified cache lines that are targeted to persistent memory (e.g., only those cache lines for which both the PM bit and the modified bit in the corresponding page table entry are set).

Figure 5:
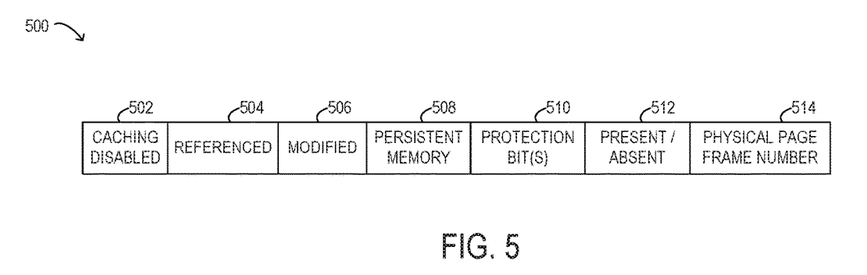
FIG. 5 is a block diagram of selected elements of an embodiment of an operating system page table entry.

The changes in the page table, as described above, may be further illustrated by way of the example operating system page table entry depicted in FIG. 5. FIG. 5 is a block diagram of selected elements of an embodiment of an operating system page table entry. In this example embodiment, the page table entry includes a page frame number field 514, and this field identifies the physical page frame number to which the virtual frame associated with a page table lookup has been mapped. In this example embodiment, the page table entry includes a present/absent field 512. In some embodiments, this field may be a single bit, which, if its value is 0, indicates that the virtual page to which the entry belongs is not currently present in the memory. Accessing a page table entry in which this bit is set to 0 may cause a page fault.

In this example embodiment, the page table entry includes one or more protection bits 510, which (collectively) indicate whether or not read and/or write access to the page to which the entry belongs are allowed. In this example embodiment, the page table entry includes a modified indicator 506 and a reference indicator 504. In at least some embodiments, each of these indicators may include one or more bits, and (collectively) they may keep track of page usage for the page to which the entry belongs. For example, when a page is written to, hardware circuitry may automatically set the modified indicator 506 to a value indicating that the page has been written to. In some embodiments, this indictor may be used by the operating system when it decides to reclaim a page frame. The referenced indicator 504 may be used to help the operating system choose a page to evict when a page fault occurs. The referenced indicator 504 may be set whenever a page is referenced. In this example embodiment, the page table entry includes a caching disabled field 502, whose value indicates whether or not cache is enabled for the virtual page to which the entry belongs. Writing a value representing "true" to this field may disable caching for the page to which the entry belongs. This feature may be especially useful for pages that map onto device registers rather than memory.

As illustrated in FIG. 5, in at least some embodiments of the present disclosure, in order to highlight to the CPU that a given page table entry has been mapped to the persistent memory, the page table may include a persistent memory (PM) field 508. In some embodiments, this may be a 1-bit field whose value, when set to "1" or "true", indicates that the page to which the page table entry belongs has been mapped to persistent memory.

Note that, in different embodiments, more, fewer or different fields may be included in a page table entry than those depicted in FIG. 5. In addition, the fields within a page table may be arranged in any order, including in an order different than that depicted in FIG. 5.

In at least some embodiments, the approach described above may provide an information handling system with the flexibility to set threshold values for modified cache lines or modified cache lines targeted to persistent memory for the caches in its cache hierarchy. This may allow the amount of data that would otherwise need to be flushed out to the persistent memory upon a power failure to be kept in check. In some embodiments, different threshold values may be selected for the different caches in the cache hierarchy. For example, different threshold values may be set for private L1 and/or L2 caches than for the public L3 or last-level caches on some processors, based on the capacity of their back-up energy sources.

Using this approach, only those cache lines whose corresponding PM field is set to a value of 1 or "true" may be counted toward the threshold value, while those cache lines targeted to volatile memories are not affected. In some embodiments, algorithms other than a simple threshold may be implemented by hardware circuitry in the cache controller to determine when and if the data in modified cache lines whose corresponding PM field values are set to 1 should be evicted. In one example, an eviction algorithm that is dependent on a holistic number of persistent memory lines across all caches in the cache hierarchy may be employed by the hardware for optimal memory performance.

Figure 6:
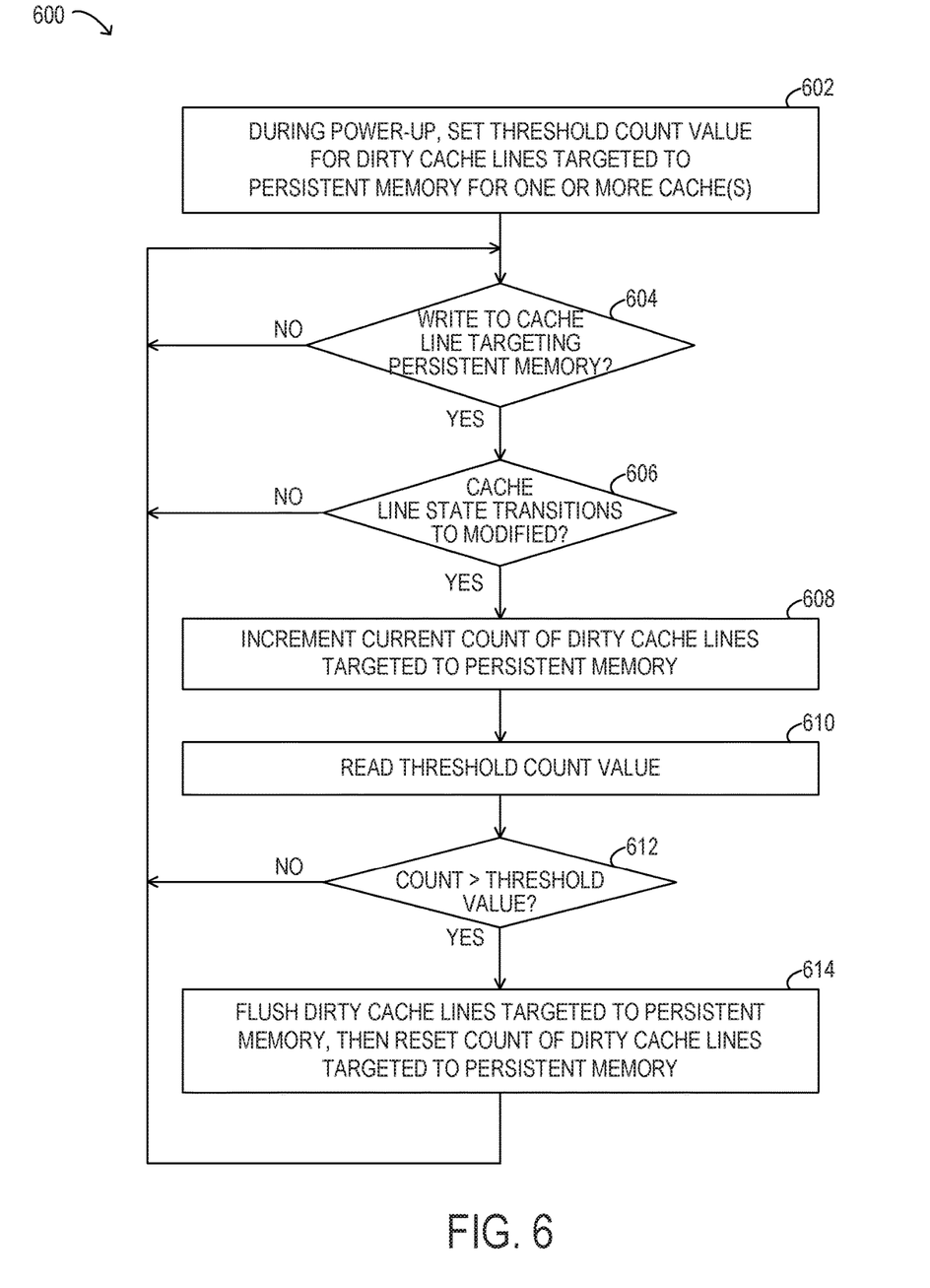
FIG. 6 is a flowchart depicting selected elements of an embodiment of a method for determining when to flush a cache based on a count of modified cache lines that target persistent memory.

Referring now to FIG. 6, a block diagram of selected elements of an embodiment of a method 600 for determining when to flush a cache based on a count of modified cache lines that target persistent memory, as described herein, is depicted in flowchart form. In various embodiments, method 600 may be performed by one or more instances of an information handling system 100 (see FIG. 1). It is noted that certain operations described in method 600 may be optional or may be rearranged in different embodiments. In at least some embodiments, some or all of the operations illustrated in FIG. 6 may be performed by a cache controller in an information handling system to enforce a predetermined limit on the number of modified cached lines in a cache that are targeted to persistent memory. In some embodiments, one or more operations of method 600 may be performed by a state machine implemented in the cache controller or elsewhere in the information handling system.

In FIG. 6, method 600 may begin (at 602) during power-up. At this point, a threshold count value for dirty cache lines that are targeted to persistent memory for one or more data cache(s) is set. In method 600, if (at 604) a write to a cache line targets persistent memory, the method continues at 606. Otherwise, a trigger condition for deciding to flush the cache based on a count of modified cache lines targeted to persistent memory remains unmet, and the method continues (at 604) by waiting for a write to a cache line targeted to persistent memory.

In method 600, if (at 606) it is determined that the state of the cache line that was written to transitions to the modified state, the method continues at 608. Otherwise, a trigger condition for deciding to flush the cache based on a count of modified cache lines targeted to persistent memory remains unmet, and the method continues (at 604) by waiting for a write to a cache line targeted to persistent memory.

In method 600, (at 608) the current count of dirty cache lines targeted to persistent memory is incremented. In method 600, (at 610) a threshold count value for is read. In method 600, if (at 612) it is determined that the current count of dirty cache lines targeted to persistent memory exceeds the threshold count value for dirty cache lines that are targeted to persistent memory, the method continues at 614. In method 600 (at 614), the dirty cache lines targeted to persistent memory are flushed to persistent memory, after which the count of dirty cache lines targeted to persistent memory is reset to zero. In method 600, if (at 612) it is determined that the current count of dirty cache lines targeted to persistent memory does not exceed the threshold count value for dirty cache lines that are targeted to persistent memory, a trigger condition for deciding to flush the cache based on a count of modified cache lines targeted to persistent memory remains unmet, and the method continues (at 604) by waiting for a write to a cache line targeted to persistent memory.

In various embodiments, the techniques described herein may be implemented to control the cache flush sizes for any or all of the caches in the cache hierarchy of the information handling system, individually or collectively. For example, in some embodiments, there may be a different respective modified cache line counter for the caches at each level in the cache hierarchy and/or a different threshold value for triggering a flush of modified cache lines to persistent memory. In other embodiments, there may be a single modified cache line counter for a pool of caches at different levels in the cache hierarchy whose value represents an aggregation of the number of modified cache lines in each cache in the pool and a single threshold value for triggering a flush of modified cache lines from those caches to persistent memory. In some embodiments, if at least one of the caches in a cache hierarchy exceeds its modified cache line threshold value, this may trigger a flush of modified cache lines in all of the caches in the cache hierarchy to persistent memory.

In some embodiments, when a determination is made to flush one or more modified cache lines from a cache at a given level in the cache hierarchy using these techniques, the cache lines may be flushed all the way out to persistent memory, regardless of the level of the cache from which they are flushed. In other embodiments, when a determination is made to flush one or more modified cache lines from a cache at a given level in the cache hierarchy using these techniques, the cache lines may be flushed to the cache at next level (if any) or to the persistent memory (if the cache is the last level cache in the cache hierarchy). In some embodiments, and for specific processors, the last level cache may be the only cache that implements the write-back to the persistent memory. In general, however, the techniques described herein may be used to control the cache flush size for any cache that, when it includes data that has not been written back to memory, is to be flushed all the way out to the persistent memory.

As previously noted, in at least some embodiments, the amount of modified cached data allowed in a given cache (or pool of caches) at any one time may be dependent on the available hold-up energy in the system and time needed to flush the modified cache lines in the cache(s) to persistent memory. In such embodiments, the threshold value that triggers a cache flush may be calculated to ensure that there would be enough time to flush all of the modified cache lines (or all of the modified cache lines targeted to persistent memory) to persistent memory before the available hold-up energy is depleted. In some embodiments, there may be different priorities for determining when to flush the modified cache lines from the different caches in the cache hierarchy to persistent memory. For example, the modified cache lines from the smallest caches (e.g., one or more L1 caches) may be flushed to persistent memory first, followed by the next smallest caches (e.g., one or more L2 caches), and so on.

As described above, an information handling system may, in some embodiments, implement a method for controlling the eADR flush timing by limiting the amount of modified cached data in one or more caches at any given time. In at least some embodiments, the method may include keeping a running count of the number of modified cache lines (or the number of modified cache lines targeted to persistent memory) in one or more caches, determining when a trigger condition based on a predetermined threshold value for modified cache lines is met and, in response, flushing some or all of the modified cache lines to persistent memory. By limiting the amount of modified cached data in the cache(s) at any given time, the number of cache lines that would need to be flushed in response to a power fault or other power loss event may be reduced to a number that can be flushed to persistent memory using the available hold-up energy in the system. In some embodiments, an information handling system that implements the techniques described herein may include and benefit from the use of high performance write-back cache despite having limited hold-up energy.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling cache flush size in an information handling system, comprising:
    setting a threshold value for modified cache lines in a cache, the setting being dependent on one or more of: available hold-up energy in the system and an amount of time needed to flush modified cache lines to persistent memory;
    writing to a cache line in the cache;
    determining whether or not the writing causes the cache line to transition to a modified state;
    in response to determining that that the writing causes the cache line to transition to the modified state:
        incrementing a count of modified cache lines in the cache;
        determining, dependent on the incremented count, whether or not the threshold value for modified cache lines in the cache is exceeded; and
        flushing one or more modified cache lines in the cache to the persistent memory, in response to determining that the threshold value for modified cache lines in the cache is exceeded, the flushing including transitioning the one or more modified cache lines from the modified state to a state other than the modified state.

2. The method of claim 1, wherein flushing one or more modified cache lines in the cache to the persistent memory comprises flushing all modified cache lines in the cache to the persistent memory.

3. The method of claim 1, wherein:
    flushing one or more modified cache lines in the cache to the persistent memory comprises flushing a number of modified cache lines in the cache to the persistent memory that is sufficient to reduce the modified cache lines in the cache below the threshold value for modified cache lines in the cache; and
    the one or more modified cache selected for flushing is dependent on an applicable cache replacement policy.

4. The method of claim 1, wherein the threshold value represents a maximum allowed number of cache lines in the cache that are in the modified state.

5. The method of claim 1, wherein:
    the threshold value represents a maximum allowed percentage of cache lines in the cache that are in the modified state; and
    determining whether or not the threshold value for modified cache lines in the cache is exceeded comprises calculating, dependent on the incremented count, the percentage of cache lines in the cache that are in the modified state.

6. The method of claim 1, wherein:
    the threshold value represents a maximum allowed number of cache lines in the cache that are in the modified state and that are targeted to the persistent memory;
    the count of modified cache lines in the cache comprises a count of cache lines in the cache that are in the modified state and that are targeted to the persistent memory; and
    flushing the one or more modified cache lines in the cache to the persistent memory comprises flushing to the persistent memory one or more modified cache lines in the cache that are targeted to persistent memory.

7. The method of claim 1, wherein flushing the one or more modified cache lines in the cache to the persistent memory comprises transitioning each of the one or more modified cache lines from the modified state to an exclusive state in which a subsequent access to the modified cache line incurs a cache hit.

8. The method of claim 1, wherein flushing the one or more modified cache lines in the cache to the persistent memory comprises transitioning each of the one or more modified cache lines from the modified state to an invalid state in which a subsequent access to the modified cache line incurs a cache miss.

9. The method of claim 1, wherein setting the threshold value is dependent on both the available hold-up energy in the system and an amount of time needed to flush the one or more modified cache lines to the persistent memory.

10. The method of claim 1, wherein setting the threshold value for modified cache lines in the cache comprises setting the threshold value to a fixed value during an initialization of the information handling system.

11. The method of claim 1, wherein:
setting the threshold value for modified cache lines in the cache comprises setting the threshold value to an initial threshold value; and
the method further comprises modifying the threshold value for modified cache lines in the cache during operation of the information handling system in response to an increase or decrease in hold-up energy.

12. An information handling system, comprising:
at least one cache; and
a cache controller comprising circuitry to:
store a threshold value for modified cache lines in a cache, the threshold value being dependent on one or more of: available hold-up energy in the system and an amount of time needed to flush modified cache lines to persistent memory;
detect a write to a cache line in the cache;
determine whether or not the write causes the cache line to transition to a modified state;
in response to a determination that that the write causes the cache line to transition to the modified state:
increment a count of modified cache lines in the cache;
determine, dependent on the incremented count, whether or not the threshold value is exceeded;
flush one or more modified cache lines in the cache to the persistent memory, in response to a determination that the threshold value is exceeded, the flushing including transitioning the one or more modified cache lines from the modified state to a state other than the modified state; and
elide a flush of the one or more modified cache lines in the cache to persistent memory, in response to a determination that the threshold value is not exceeded.

13. The information handling system of claim 12, wherein to flush the one or more modified cache lines in the cache to the persistent memory, the cache controller comprises circuitry to:
flush all modified cache lines in the cache to the persistent memory; or
flush, dependent on an applicable cache replacement policy, a number of modified cache lines in the cache to the persistent memory that is sufficient to reduce the modified cache lines in the cache below the threshold value for modified cache lines in the cache.

14. The information handling system of claim 12, wherein the threshold value is dependent on both the available hold-up energy in the system and an amount of time needed to flush the one or more modified cache lines to the persistent memory.

15. The information handling system of claim 12, wherein the threshold value represents a maximum allowed number of cache lines in the cache that are in the modified state or a maximum allowed percentage of cache lines in the cache that are in the modified state.

16. The information handling system of claim 12, wherein the threshold value for modified cache lines in the cache is configurable during an initialization of the information handling system or during operation of the information handling system.

17. The information handling system of claim 12, wherein:
the information handling system further comprises a page table including a plurality of entries, each of which includes a first field whose value indicates whether or not a respective cache line is targeted to persistent memory and a second field whose value indicates whether or not the respective cache line has been modified;
the threshold value represents a maximum allowed number of cache lines in the cache that are in the modified state and that are targeted to the persistent memory;
the cache controller further comprises circuitry to:
determine, dependent on its respective page table entry, whether or not the written cache line is targeted to persistent memory; and
increment the count of modified cache lines in the cache in response to a determination that the written cache line is targeted to persistent memory;
to flush the one or more modified cache lines in the cache to persistent memory, the cache controller further comprises circuitry to flush to the persistent memory only cache lines in the cache that are in the modified state and that are targeted to the persistent memory.

18. A cache controller, comprising circuitry to:
store a threshold value for modified cache lines in a cache, the threshold value being dependent on one or more of: hold-up energy available from a back-up energy source and an amount of time needed to flush modified cache lines to persistent memory;
detect a write to a cache line in the cache;
determine whether or not the write causes the cache line to transition to a modified state;
in response to a determination that that the write causes the cache line to transition to the modified state:
increment a count of modified cache lines in the cache;
determine, dependent on the incremented count, whether or not the threshold value is exceeded;
flush one or more modified cache lines in the cache to the persistent memory, in response to a determination that the threshold value is exceeded, the flushing including transitioning the one or more modified cache lines from the modified state to a state other than the modified state; and
elide a flush of the one or more modified cache lines in the cache to persistent memory, in response to a determination that the threshold value is not exceeded.

19. The cache controller of claim 18, wherein to flush the one or more modified cache lines in the cache to the persistent memory, the cache controller comprises circuitry to:
flush all modified cache lines in the cache to the persistent memory; or
flush, dependent on an applicable cache replacement policy, a number of modified cache lines in the cache to the persistent memory that is sufficient to reduce the modified cache lines in the cache below the threshold value for modified cache lines in the cache.

20. The cache controller of claim 18, wherein the threshold value is dependent on both the hold-up energy available from the back-up energy source and an amount of time needed to flush the one or more modified cache lines to the persistent memory.

\* \* \* \* \*